United States Patent [19]

Mitchell, III et al.

[11] 4,122,229

[45] Oct. 24, 1978

[54] THERMOPLASTIC REINFORCING ADHESIVES AND SUBSTRATES COATED THEREWITH

[75] Inventors: Mark L. Mitchell, III; Hubert J. Sharkey, both of Cincinnati, Ohio

[73] Assignee: Emery Industries, Inc., Cincinnati, Ohio

[21] Appl. No.: 803,800

[22] Filed: Jun. 6, 1977

Related U.S. Application Data

[62] Division of Ser. No. 747,771, Dec. 6, 1976, Pat. No. 4,062,820.

[51] Int. Cl.$^2$ .................... B32B 27/06; B32B 27/34; C08L 91/00; A43C 13/14
[52] U.S. Cl. .................................... 428/261; 36/77 R; 260/18 N; 428/290; 428/474; 428/540
[58] Field of Search ............. 428/474, 475, 476, 477, 428/478, 479, 537, 539; 260/18 N, 857 PG

[56] References Cited

U.S. PATENT DOCUMENTS

| | | | |
|---|---|---|---|
| 2,433,450 | 6/1948 | Graham et al. | 428/476 X |
| 3,473,956 | 10/1969 | McIntyre et al. | 428/474 X |
| 3,499,853 | 3/1970 | Griebsch et al. | 260/18 N |
| 3,708,332 | 1/1973 | Closson | 428/339 X |
| 3,925,589 | 12/1975 | Sturwold et al. | 428/474 X |
| 3,950,297 | 4/1976 | Raabe et al. | 428/474 X |
| 4,045,389 | 8/1977 | Drawert et al. | 428/474 X |

FOREIGN PATENT DOCUMENTS 1,319,807  6/1973  United Kingdom ................. 260/18 N

OTHER PUBLICATIONS

Chemical Abstracts: vol. 64, (1966) p. 14380g, Schering A. G. "Copolyamide Adhesives."

*Primary Examiner*—George F. Lesmes
*Assistant Examiner*—Daniel R. Zirker
*Attorney, Agent, or Firm*—Gerald A. Baracka; John D. Rice

[57] ABSTRACT

Copolyamides derived from mixed acids (a polymeric fatty acid and short-chain dibasic acid) and mixed amines (a polyoxyalkylene diamine and a short-chain diamine) are provided. These thermoplastic resin compositions are excellent reinforcing adhesives for flexible substrates and are particularly useful as box-toe construction resins.

4 Claims, No Drawings

THERMOPLASTIC REINFORCING ADHESIVES AND SUBSTRATES COATED THEREWITH

This is a division, of application Ser. No. 747,771, filed Dec. 6, 1976, now U.S. Pat. No. 4,062,820.

BACKGROUND OF THE INVENTION

It is customary for shoe manufacturers to reinforce the toe end of the upper to obtain improved wear and retention of shape. It is accepted practice throughout the shoe industry to obtain such reinforcement by the application of a thermoplastic stiffening resin, sometimes referred to as a box-toe resin, to the toe portion of the upper. The thermoplastic resin is applied as a melt and upon cooling forms a stiff resilient reinforcing coating on the upper.

For a thermoplastic resin to be an acceptable stiffener in this application the resin must satisfy the following requirements: first of all, the resin should have some adhesive character; it should have a low melt viscosity, preferably less than 150 poise at 190° C.; the resin should set rapidly to prevent "welding" of stacked assemblages of the manufactured articles; and the resin must be stiff to impart and retain the desired shape but it must also have sufficient flexibility, even at low temperatures, to resist cracking upon impact and to "snap back" to its original shape. This latter property or more correctly, balance of properties is sometimes referred to as "rigid flexibility" and is perhaps the most troublesome and difficult property to develop in a thermoplastic resin, particularly in polyamide resins. Heretofore it has only been possible to obtain this difficult yet critical balance of properties by blending the thermoplastic polyamide resin with a minor amount of one or more other compositions including other polyamide resins. A single polyamide resin possessing all the aforementioned characteristics so as to be useful in shoe manufacturing operations in neat form has heretofore not been available.

Polyamide resins derived from polymeric fatty acids and conventional diamines are unacceptable since they become brittle upon aging and have a tendency to crack when flexed, especially at low temperatures. The use of mixed diamines, e.g. mixtures of ethylene diamine and hexamethylene diamine, with polymeric fatty acids improves the flexibility at low temperatures, however, the resins lack resiliency and memory and are unable to "snap-back" to their original configuration. The incorporation of a short-chain dibasic acid with the polymeric fatty acid improves the stiffness but reduces the impact resistance of the resin to a point where it is unacceptable.

U.S. Pat. No. 3,499,853 discloses thermoplastic adhesives derived from relatively low molecular weight ether diamines, by themselves or in combination with ethylene diamine, and polymeric fatty acids. The resulting thermoplastic copolyamides have high resistance to peel and excellent adhesive properties. When mixtures of ethylene diamine and ether diamines are employed the equivalent ratio of ethylene diamine to ether diamine can range as high as about 0.9:0.1 but, more preferably, will be between about 0.7:0.3 and about 0.6:0.4. Even though the copolyamides of U.S. Pat. No. 3,499,853 have excellent impact resistance they are not suitable box-toe resins since they have unacceptable resilience and are too soft. British Patent No. 1,319,807 also discloses the use of copolyamide resins derived from polymeric fatty acids and low molecular weight aliphatic ether diamines.

SUMMARY OF THE INVENTION

We have now quite unexpectedly discovered that copolyamides derived from a mixture of a polymeric fatty acid and a short-chain dibasic acid and a mixture of a polyoxyalkylene diamine and a short-chain diamine are superior box-toe construction resins which satisfy all the aforementioned criteria for such adhesive compositions. To obtain these copolyamides very specific reactants must be employed within well defined limits. It is totally unexpected that the copolyamides of this invention are suitable resins for box-toe construction in neat form and do not need to be blended with other additives and/or resins to develop highly useful and efficient properties.

The copolyamide resins of this invention are obtained by the reaction of essentially stoichiometric amounts of a mixed acid component and a mixed amine component. A polymeric fatty acid obtained by the polymerization of an olefinically unsaturated monocarboxylic acid containing 16 to 20 carbon atoms is an essential component of the acid mixture. $C_{36}$ dimer acids are especially useful for this invention. A short-chain saturated aliphatic dicarboxylic acid containing 7 to 12 carbon atoms, preferably azelaic acid or sebacic acid, is employed with the polymeric fatty acid. The equivalent ratio of polymeric fatty acid to short-chain dibasic acid ranges from 0.95:0.05 to 0.7:0.3. The mixed diamines consist of a short-chain diamine containing from 2 to 6 carbon atoms, preferably, ethylenediamine, and a polyoxyalkylene diamine having a molecular weight from about 600 to 5000. The equivalent ratio of short-chain diamine to polyoxyalkylene diamine, preferably having a molecular weight from 1000 to 5000, will range from about 0.92:0.08 and 0.995:0.005. The resulting reinforcing copolyamide resins typically have an acid value and amine value less than 15, softening point in the range 140°–190° C., viscosity (190° C.) less than 150 poise, compression strength greater than 85 grams with a brittleness temperature less than −10° C. These resins can be applied to a variety of substrates including leather and synthetic poromeric materials, woven and nonwoven fabrics, and a wide variety of polymeric materials and will readily adhere thereto. A 1–50 mil film of the copolymer on the substrate provides a tough resilient reinforcing coating on the substrate so that it can be shaped and otherwise molded to the desired configuration and will retain this shape during use. These resins are particularly adaptable for use with leather, fabrics and vinyl polymers used in box-toe construction and impart greater stiffness to the substrate while maintaining flexibility.

DETAILED DESCRIPTION

The improved copolyamides of this invention are derived from polymeric fatty acids obtained by the polymerization of olefinically unsaturated monocarboxylic acids containing 16 to 20 carbon atoms, such as oleic acid, linoleic acid, linolenic acid, eleostearic acid and the like. Dicarboxylic acids produced in this manner, that is, when two moles of the monocarboxylic acid are combined, are referred to as dimer acids. Processes for the production of dimer acids are well known to the art and by way of illustration reference may be had to U.S. Pat. No. 2,793,219 and 2,955,121. $C_{36}$ dimer acids obtained by the dimerization of an unsaturated $C_{18}$ acid such as oleic acid, linoleic acid and mixtures thereof (e.g. tall oil fatty acids) are especially useful and advantageously employed for the preparation of the copolyamides. Such dimer acids have as their principal component a $C_{36}$ dicarboxylic acid and typically have an acid value in the range 180–215, saponification value in the range 190–205 and neutral equivalent from 265–310. Dimer acids containing less than 30% by weight by-product acids including monobasic acids, trimer acids or higher polymer acids are especially useful for this invention. It is even more advantageous if the dimer acid is hydrogenated prior to use. The dimer acids may also be molecularly distilled or otherwise purified to increase the $C_{36}$ dimer content to 90% or more.

A short-chain saturated aliphatic dicarboxylic acid containing from about 7 to 12 carbon atoms is necessarily included with the polymeric fatty acid to obtain the copolyamides of this invention. Preferably, the saturated aliphatic dibasic acid will be azelaic acid or sebacic acid. The equivalent ratio of polymeric fatty acid to short-chain dibasic acid will range from about 0.95:0.05 to 0.7:0.3 and, more preferably, will be in the range 0.92:0.08 to 0.85:0.15.

An essentially stoichiometric amount of a mixture of amines consisting of a short-chain diamine and polyoxyalkylene diamine is reacted with the above-defined acid mixture to obtain the improved copolyamide resin compositions. The short-chain diamine will contain from 2 to 6 carbon atoms and corresponds to the formula

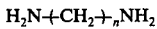

where $n$ is an integer from 2 to 6. Useful saturated aliphatic diamines include ethylenediamine, propylenediamine, tetramethylenediamine, pentamethylenediamine and hexamethylenediamine. Especially useful copolyamides are obtained in accordance with this invention when the short-chain diamine is ethylenediamine.

Present with the short-chain diamine is a polyoxyalkylene diamine corresponding to the general formula

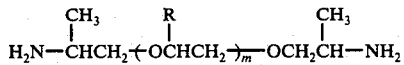

where R is hydrogen or a methyl group and $m$ is a positive integer such that the average molecular weight of the polyoxyalkylene diamine is between about 600 and 5000 and, more preferably, 900 and 2500. The equivalent ratio of the short-chain diamine to polyoxyalkylene diamine will range from about 0.92:0.08 and 0.995:0.005. Superior resins, especially useful as reinforcing adhesives for box-toe construction, are obtained when the equivalent ratio of the respective diamine components ranges from 0.95:0.05 to 0.98:0.02 particularly when the resin contains from 8 to 12 weight percent of the polyoxyalkylene component.

Employing essentially stoichiometric amounts of the above-defined acid and amine mixture yields high performance thermoplastic copolyamide resins having excellent adhesion to flexible substrates. These resins are excellent reinforcing adhesives for box-toe construction since the products exhibit a high degree of stiffness or modulus while maintaining excellent impact resistance and low brittleness temperature. A typical copolyamide composition obtained in accordance with this invention would have the following physical properties: softening point 140–190; 190° C. viscosity less than 150 poise; compression strength greater than 85 grams; and brittleness temperature less than −10° C.

The instant copolyamide resins are prepared using conventional procedures and reaction conditions known to the art. Essentially stoichiometric amounts of the acid and amine components are reacted until the final product has an acid value and an amine value less than 15 and even more preferably less than 10. The reaction may be conducted at a temperature between about 100° C. and 300° C. Most often the reactions will be heated from 140° to 240° C. until the theoretical amount of water is evolved. Generally several hours are required to complete the reaction. The reaction is preferably conducted under an inert atmosphere, such as nitrogen, and during the final stages of the reaction a vacuum is applied to the system to facilitate removal of the final traces of water and any other volatile materials.

The copolyamides can be employed to reinforce a variety of natural and synthetic, flexible substrates. They are particularly useful with leather, suede and synthetic poromeric materials; open- and closed-cell materials derived from polyurethane, vinyl, natural rubber, neoprene, styrene-butadiene copolymer, polybutadiene or the like; woven and nonwoven fabrics obtained from natural fibers such as cotton, wool, silk, sisal, hemp, jute, kenaf, sunn and ramie; woven and nonwoven fabrics derived from rayon (viscose), cellulose esters such as cellulose acetate and cellulose triacetate, proteinaceous fibers, such as those derived from casein, and synthetic fibers or filaments including polyamides such as those obtained by the condensation of adipic acid and hexamethylenediamine or the like, polyesters such as polyethylene terephthalate, acrylic fibers containing a minimum of about 85 percent acrylonitrile with vinyl chloride, vinyl acetate, methacrylonitrile or the like and the modacrylic fibers which contain lesser amounts of acrylonitrile, copolymers of vinyl chloride with vinyl acetate or vinylidene chloride, the formal derivatives of polyvinyl alcohol and olefin polymers such as polyethylene and polypropylene; paper; cork; elastomeric materials; and the like. The copolyamides are applied to the substrate as a hot melt and upon cooling provide greater stiffness while maintaining flexibility of the substrate. The resin can be applied using conventional hot melt application procedures, such as printing, dipping, spreading, rolling, etc. and the film thickness can range from about 1 mil up to about 50 mils. While for most constructions the resin is applied to only one side of the substrate, it may be applied to both sides and a fabric or the like applied to either side, or both, to form a sandwich type construction. In a typical box-toe construction, the copolyamide is printed onto one side of the substrate to a thickness of 2 to 10 mils. A fabric (nylon, polyester, cotton, etc.) liner may be applied to the interior of the box-toe before the resin has completely set.

The following examples illustrate the invention more fully, however, they are not intended to limit the scope of the invention and numerous variations will be evident to those skilled in the art. In these examples all parts are on a weight basis unless otherwise indicated.

EXAMPLE I

Azelaic acid, a polymerized fatty acid (75% $C_{36}$ dimer acid, 20% trimer acid and 5% monocarboxylic acid), ethylenediamine and a polyoxypropylene diamine having an average molecular weight of about 2000 were charged to a glass reactor as follows:

|  | Parts | Equivalent Ratio |
|---|---|---|
| Polymerized Fatty Acid | 390.5 | 0.91 |
| Azelaic Acid | 22.5 | 0.16 |
| Ethylenediamine | 43.2 | 0.96 |
| Polyoxypropylene Diamine | 60.0 | 0.04 |

A slight excess of the acids was used to avoid excessive molecular weight buildup. The reactants were then heated under a nitrogen atmosphere to about 160° C. and as the reaction progressed the temperature was steadily increased to a maximum temperature of 240° C. Water of condensation was removed by use of a condenser/trap arrangement and when about 95% of the theoretical amount of water was collected a vacuum of about 5 Torr was applied to remove the final traces of water and any other volatiles present. The resulting resin had an amine value of 3.6, acid value of 4.4 and 190° C. viscosity (Brookfield Thermosel) of 91.5 poise with a softening point of 158°–162° C. (determined after 18 hours in accordance with ASTM Test Method E-28).

The compression strength, considered to be the most reliable indicator of a resins resilience and adaptability for box-toe construction, was determined by placing a polymer strip (1 × 3 × 0.022 ± 0.003 inches) in a compression jig designed so that the polymer strip formed an arc of 180° C. with the ends of the strip spaced 2 5/16 inches apart. The assembled jig was mounted in the pneumatic jaws of an Instron Tester fitted with a "C" cell at high sensitivity. The upper member of the jig was pulled down by the lower Instron grip to compress the top of the polymer arc to ¾ inch above its base. The indicated force in grams at this point was reported as the compression strength (this force includes the gross weight of the polymer strip). All compression specimens were aged at least 24 hours at 72° F. prior to testing. Uniform width and length are assured by use of a JDC-25 cutter and a "C" template respectively. If the sample thickness is not 0.022 ± 0.001 inches, the compression strength is interpolated to that value. The compression strength (average of at least three determinations) of the above resin sample was 110 grams.

Additional physical properties of the resin were determined as follows:

| Tensile Strength (ASTM D-882) | 1750 psi |
|---|---|
| Elongation at Break (ASTM D-882) | 40% |
| Young's Modulus (ASTM D-882) | 12100 |
| Brittleness Temperature (ASTM D-1593) | −24° C. |

The resin exhibited good adhesive properties with a variety of materials. For example, the shear strength obtained in accordance with ASTM Test Method D-1002 with aluminum and steel was 1100 psi. The molten resin was also applied to a variety of flexible substrates including cotton duck and leather. The resin exhibited good adhesion properties and imparted increased rigidity and resilience to these substrates without destroying their flexibility. A peel strength of 13 lb./in. was obtained with cotton duck using ASTM Test Method D-1876. When this same test method was used to determine the peel strength of the reinforced leather specimen failure of the leather occurred before adhesive failure.

EXAMPLE II

Employing a procedure similar to that described in Example I a reinforcing adhesive resin was prepared using a polyoxypropylene diamine having an average molecular weight of 1000. The reactant charge and physical properties of the resulting resin were as follows:

|  | Parts | Equivalent Ratio |
|---|---|---|
| Polymerized Fatty Acid | 390.4 | 0.91 |
| Azelaic Acid | 27.5 | 0.16 |
| Ethylenediamine | 41.4 | 0.92 |
| Polyoxypropylene Diamine | 60.0 | 0.08 |
| Physical Properties: |  |  |
| Acid Value |  | 7.7 |
| Amine Value |  | 2.7 |
| 190° C Viscosity (poise) |  | 125 |
| Softening Point (° C) |  | 160 |
| Tensile Strength (psi) |  | 1750 |
| Elongation |  | 50 |
| Young's Modulus |  | 9100 |
| Compression Strength (grams) |  | 86 |
| Brittleness Temperature (° C) |  | −25 |

This resin exhibited good adhesion to leather, plasticized vinyl and woven fabrics when a film of the resin was applied thereto as a hot melt, and upon cooling the resin was an effective stiffener for these flexible substrates.

EXAMPLES III AND IV

To demonstrate the versatility of the present invention Example I was repeated varying the equivalent ratios of the reactants. The reactant charges and physical properties for these resins were as follows:

|  | Resin III | Resin IV |
|---|---|---|
| Equivalent Ratio of Reactants: |  |  |
| Polymerized Fatty Acid | 0.91 | 0.86 |
| Azelaic Acid | 0.15 | 0.15 |
| Ethylenediamine | 0.98 | 0.94 |
| Polyoxypropylene Diamine | 0.02 | 0.06 |
| Physical Properties: |  |  |
| Amine Value/Acid Value | 2/12 | 1/9 |
| 190° C Viscosity (poise) | 111 | 56 |
| Softening Point (° C) | 162 | 158 |
| Tensile (psi) | 1600 | 1200 |
| Elongation (%) | 35 | 30 |
| Compression Strength (grams) | 120 | 86 |
| Brittleness Temperature (° C) | −9 | −25 |

EXAMPLE V

Dimer Acid (390.5 parts) was combined with 22.4 parts azelaic acid 45.2 parts ethylenediamine and 60 parts polyoxypropylene diamine (average molecular weight 2000) and the mixture reacted in accordance with the procedure of Example I. After an initial period of reaction (zero amine value, acid value of 3.7 and 190° C. viscosity of 150 poise) and additional charge of dimer acid (3.4 parts) was made and the reaction mixture heated for three additional hours while applying a vacuum. The final resin had an amine value of 2.4 acid value of 6.8, 190° C. viscosity of 89.5 poise and softening point of 159°–163° C. Other properties of the resulting reinforcing adhesive resin were as follows:

| | |
|---|---|
| Tensile Strength (psi) | 1500 |
| Elongation (%) | 30 |
| Young's Modulus | 12200 |
| Compression Strength (grams) | 110 |
| Brittleness Temperature (° C) | −25 |

This resin was applied in molten form to the toe portion of both leather and vinyl shoe uppers and upon cooling it provided acceptable stiffening of the upper so that the toe retained the initially imparted configuration. The resin also had sufficient resilience so that the reinforced toe portion had the ability to "snap back", i.e., regain its original shape, after it was deformed.

We claim:

1. A reinforced box-toe construction comprising a flexible substrate selected from leather, fabric or vinyl polymer and having applied thereto an adherent copolyamide resin consisting essentially of the reaction product of (a) a mixture of a polymeric fatty acid, obtained from the polymerization of an olefinically unsaturated monocarboxylic acid containing from 16 to 20 carbon atoms, and a saturated aliphatic dicarboxylic acid having from 7 to 12 carbon atoms, the equivalents ratio of the respective acid components ranging from about 0.95:0.05 to about 0.7:0.3, with (b) a mixture of a saturated aliphatic diamine having from 2 to 6 carbon atoms and a polyoxyalkylene diamine of the formula

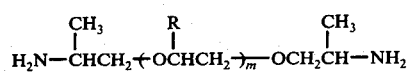

where R is hydrogen or a methyl group and $m$ is a positive integer so that the average molecular weight of the polyoxyalkylene diamine is between 600 and 5000, the equivalents ratio of said aliphatic diamine to said polyoxyalkylene diamine ranging from about 0.92:0.08 to 0.995:0.005, said resin having a softening point in the range 140°–190° C., 190° C. viscosity less than 150 poise, compression strength greater than 85 grams and brittleness temperature less than −10° C., and said adherent copolyamide resin present on the substrate to a thickness of 1 to 50 mils.

2. The reinforced article of claim 1 wherein the polymeric fatty acid is predominantly a $C_{36}$ dimer acid and contains less than 30 weight percent by-product acids, the aliphatic dicarboxylic acid is azelaic acid or sebaic acid, the aliphatic diamine is ethylenediamine and the polyoxyalkylene diamine has an average molecular weight of 900 to 2500.

3. The reinforced article of claim 2 wherein the copolyamide contains from 8 to 12 weight percent polyoxyalkylene diamine reacted therein and the equivalent ratio of polymeric fatty acid to aliphatic dicarboxylic acid is in the range 0.92:0.08 and 0.85:0.15 and the equivalent ratio of aliphatic diamine to polyoxyalkylene diamine is in the range 0.95:0.05 and 0.98:0.02.

4. The reinforced article of claim 3 wherein the copolyamide resin is present on the substrate at a thickness of 2 to 10 mils.

* * * * *